Feb. 6, 1962 C. G. COURNEYA 3,020,429
D.C. MOTOR COMMUTATOR CONSTRUCTION
Filed Nov. 9, 1959
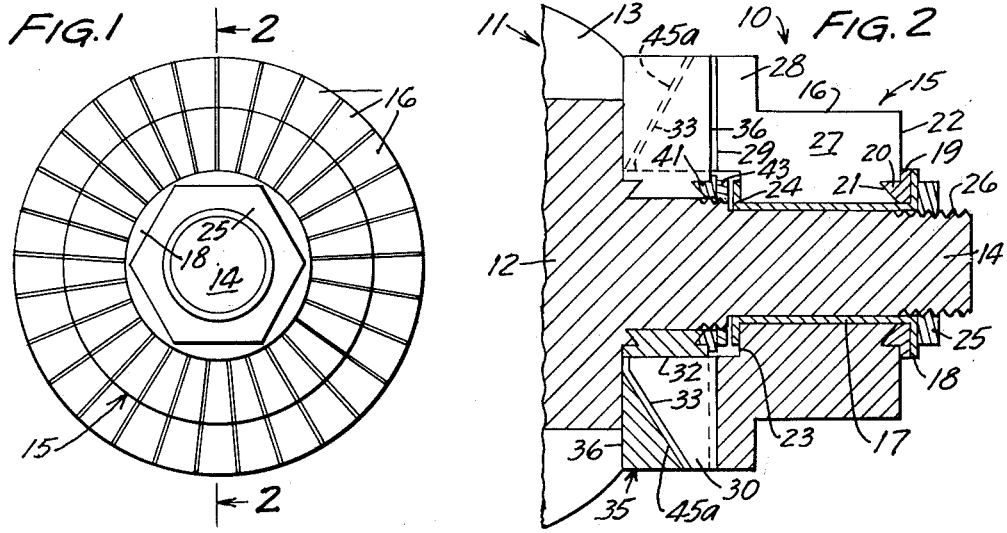
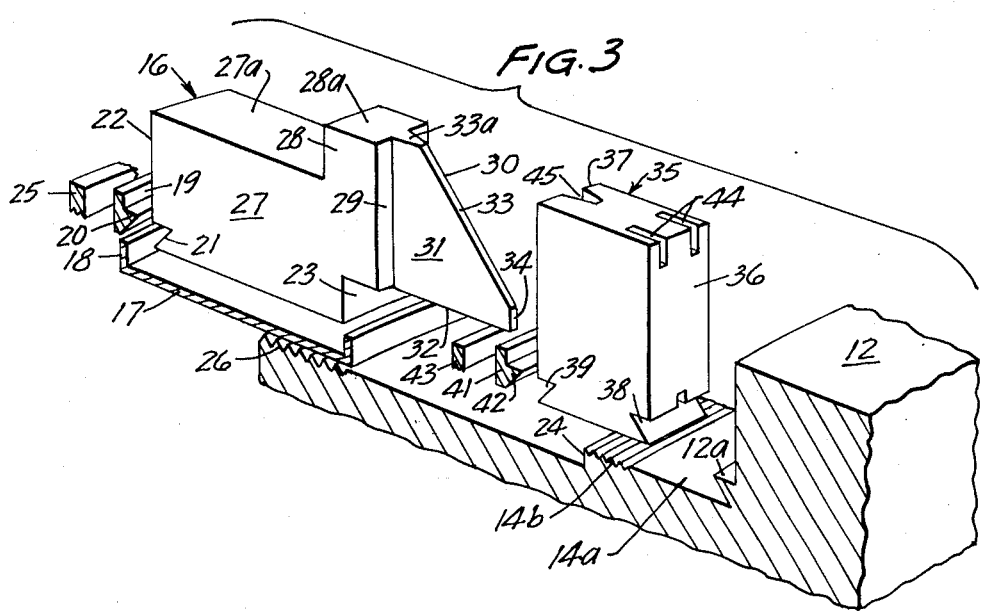
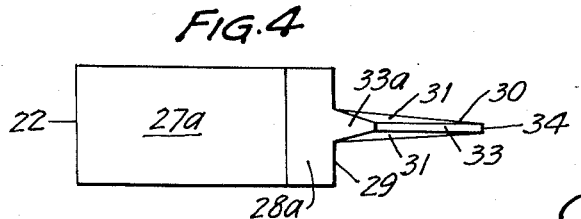
INVENTOR
*Calice G. Courneya*
BY *Williamson, Schroeder & Palmatier*
ATTORNEYS

United States Patent Office 3,020,429
Patented Feb. 6, 1962

3,020,429
D.C. MOTOR COMMUTATOR CONSTRUCTION
Calice G. Courneya, 421 6th St. SE., Minneapolis, Minn.,
assignor of fifty percent to B. J. Reger, Fargo, N.Dak.
Filed Nov. 9, 1959, Ser. No. 851,679
8 Claims. (Cl. 310—234)

This invention relates to commutator construction and more particularly to sectionalized commutator constructions for use with D.C. machines.

An object of this invention is to provide a novel and improved commutator structure, of simple and inexpensive construction, for use with D.C. type machines.

Another object of this invention is the provision of the rotor of a D.C. machine with a sectionalized commutator construction including a brush engaging section arranged and constructed to be removed from the rotor without requiring the rotor windings to be disconnected from the commutator.

A more specific object of this invention is the provision of a rotor in a D.C. machine with a commutator construction including segmented sections arranged in interengaging relation to provide an effective electrical connection and being detachable to permit the brush engaging portion of the commutator to be readily removed from the rotor thus obviating the necessity of disconnecting the rotor windings from the commutator.

These and other objects and advantages of this invention will more fully appear from the following description, made in connection with the accompanying drawings, wherein like reference characters refer to the same or similar parts throughout the several views, and in which:

FIG. 1 is an end elevational view of the novel commutator construction shown mounted on the rotor of a D.C. type machine;

FIG. 2 is a vertical section taken on line 2—2 of FIG. 1 and looking in the direction of the arrows;

FIG. 3 is an enlarged exploded fragmentary view in perspective of the novel commutator construction; and FIG. 4 is a top plan view of a commutator segment.

Referring now to the drawings and more specifically to FIG. 2, it will be seen that my novel commutator construction, generally designated 10, is shown secured to the rotor or armature 11 of a conventional D.C. machine such as an electric generator or electric motor. Rotor or armature 11 includes a rotor body 12 having conventional windings 13 and an end shaft 14 extending therefrom and which is substantially circular in cross sectional configuration, as best seen in FIG. 1.

Referring now to FIG. 2, it will be seen that my novel commutator construction 10 includes a commutator ring designated by the reference numeral 15 which is comprised of a plurality of commutator segments 16 mounted in circumferentially adjacent relation upon the periphery of a sleeve 17. Sleeve 17, which as seen in FIG. 2, fits around end shaft 14 and is provided with out-turned radially extending flanges 18 at each end thereof.

Commutator segments 16 are clamped upon the periphery of sleeve 17 by a V-ring 19 which is interposed between the outermost of flanges 18 and the commutator segments 16. V-ring 19 is provided with a V-shaped lip 20 which fits within a V-shaped recess 21 formed in each of the commutator segments 16 adjacent the outer end 22 of each of the segments and serves to secure the segments against movement on the sleeve because of the dove-tail interlocking arrangement. The inner end of each of the commutator segments 16 is recessed to define a shoulder 23 which bears against the innermost flanges 18 so that the segments are arranged in radial relation upon the sleeve 17. It is understood, of course, that each segment 16 is insulated from each adjacent segment and from the sleeve 17 by mica in the usual fashion although not shown on the drawings.

When commutator ring 15 is positioned on end shaft 14, the innermost flange 18 a shoulder 24 defined by an enlarged portion 14a of the end shaft. The outermost end of end shaft 14 is threaded as at 26 and receives a nut 25 thereon which when tightened secures the commutator ring 15 on the shaft. Thus it will be seen that commutator ring 15 is removably mounted on end shaft 14.

Each of the commutator segments 16 includes a body 27 having a riser portion 28 extending radially outwardly therefrom as best seen in FIG. 3. The sides of the body portion 27 converge radially inwardly to permit the segments to be arranged into a circumferentially adjacent ring shape as seen in FIG. 1. The body portion 27 of each of the segments 16 is also provided with an outwardly disposed brush engaging surface 27a which are engaged by the brushes of the generator or motor.

The inner end 29 of each of the segments 16 or that end which is disposed axially closest to the rotor body 12 is provided with a blade 30 extending axially therefrom. It will be seen that body 27 and blade 30 of each commutator segment 16 are integrally formed and that blade 30 is disposed generally in a radial plane. The sides 31 of blade 30 are substantially planar and converge radially outwardly and axially away from body 27 so that blade 30 has a wedge shaped configuration.

Blade 30 also includes an inner edge 32 which is substantially parallel with the axis of ring 15 and also includes an outer edge 33 and an end edge 34. The outer edge 33, as best seen in FIG. 3, converges axially away from the body 27 towards the inner edge 32 and it will be noted that because of the convergent relationship of sides 31, the widths of outer edge 33 and end edge 34 are substantially equal throughout their longitudinal extents. Blade 30 is truncated as at 33a and is co-planar with the radially disposed surface 28a of riser portion 28.

In many of the conventional D.C. machines the motor or armature windings are permanently affixed to the commutator by welding or the like and when the brush engaging surfaces of the commutator become worn, the commutator must be removed which requires disconnection of the motor windings therefrom. When the commutator is replaced, the motor windings must again be soldered or affixed to the commutator and this replacement operation is a laborious and time consuming process. To this end, my novel commutator construction is so arranged and constructed so as to obviate the necessity of disconnecting the motor windings from the commutator.

Referring now to FIG. 3, it will be seen that my commutator construction 10 includes a plurality of riser segments 35 each having an inner end 36 and an outer end 37. Each of the riser segments 35 are provided with a V-shaped recess 38 formed in its inner end 36 and V-shaped recess 39 formed in the outer end 37. Rotor body 12 is provided with an annular tang 12a having a V-shaped cross sectional configuration which fits in the V-shaped recess 38 of each of the riser segments 35 in a dove-tail interlocking arrangement. The riser segments 35 are arranged in circumferentially adjacent relationship upon the enlarged portion 14a of shaft 14 and V-ring 41 having a V-shaped lip 42 fits within the V-shaped recess 39 of the riser segments. V-ring 41 is held in clamping relation against riser segments 35 by a nut 43 threadedly engaging threads 14b on the enlarged portion 14a and the riser segments 35 are retained in a ring upon the enlarged portion 14a of end shaft 14.

Again referring to FIG. 3, it will be seen that each of the riser segments 35 are provided with radially spaced slots 44 which receive the ends of the rotor windings 13 therein and which are affixed thereto as by soldering or the like. It is to be understood, of course, that each riser segment 35 is insulated from each adjacent riser segment and from the rotor shaft and rotor body by insulating material such as mica or the like.

The outer end 37 of each of the riser segments 35 is provided with a recess or surface 45 having a shape corresponding to the shape of the blade 30 of commutator segment 16. When the commutator ring 15 is positioned on end shaft 14, blades 30 fit within recess 45 of the respective riser segments 35 in wedged relation therein.

Referring now to FIG. 2, it will be seen that the surface portion 45a defined by recess 45 which corresponds to the outer edge 33 of blade 30 is spaced from the outer edge because of the wedged relation of the blade and recess 45. It will also be noted that a major portion of each of the sides 31 of each blade 30 engage the corresponding surface portions of a riser segment 35 which define the recess 45 and provide a very effective electrical connection. It will also be noted that when the commutator segment is so positioned with respect to the riser segments 35, an interlocking relationship is thereby effected to prevent any radial displacement because of centrifugal force which results from the rotation of the rotor.

When the brush engaging surfaces 27a become worn or pitted because of extended use, nut 25 is merely removed from end shaft 14 and the commutator ring 15 may thereafter be readily removed therefrom. A new ring may thereafter be positioned in place and secured thereto which, of course, does not require disconnecting the motor windings from the remaining portions of the commutator construction.

It will therefore be seen that I have provided a novel commutator construction comprising separable sections arranged and constructed to permit ready removal of the brush engaging portions thereof when these portions become worn through usage. With particular arrangement, removal and replacement of the worn portions of the commutator construction may be accomplished with a minimum of effort in a minimum amount of time. It will also be seen from the foregoing description that my novel commutator construction is arranged and constructed to permit a positive and effective electrical connection between the separable sections which permits efficient functioning thereof. Thus it will be seen that my novel commutator construction is not only constructed for efficient operation but is also arranged and constructed to permit worn parts thereof to be readily removed thus saving time and labor.

It will, of course, be understood that various changes may be made in the form, details, arrangement and proportions of the parts without departing from the scope of my invention which consists of the matter shown and described herein and set forth in the appended claims.

What is claimed is:

1. Commutator construction for use with D.C. machines comprising a plurality of commutator segments arranged in circumferentially adjacent ring shape, means for retaining said segments in a ring upon a rotor of a D.C. machine, each of said segments having a blade extending axially therefrom and disposed generally in a radial plane, each plate having opposed sides converging radially outwardly and axially away from its respective segment, a plurality of riser segments arranged in circumferentially adjacent ring shape, means for retaining said riser segments in a ring upon a rotor of a D.C. machine, and each of said riser segments having a surface therein corresponding to the shape of said blades for receiving a blade in wedged relation therein.

2. Commutator construction for use with D.C. machines comprising an annular ring including a plurality of commutator segments clamped in circumferentially adjacent relationship, each of said commutator segments having a blade extending axially therefrom and disposed generally in a radial plane, each blade having opposed sides converging radially outwardly and axially away from its respective segment, means for securing said ring upon a rotor of a D.C. machine, a plurality of riser segments arranged in circumferentially adjacent ring shape, means for retaining said riser segments in a ring upon the rotor of a D.C. machine with each riser segment being axially aligned with one of said commutator segments, and each of said riser segments having a recess therein corresponding to the shape of said commutator segment blades for receiving a blade in wedged relation therein.

3. Commutator construction for use with D.C. machines comprising an annular ring including a plurality of commutator segments clamped in circumferential adjacent relation and each segment including a body portion having an outwardly disposed brush-engaging surface, each of said segments having a blade extending axially from said body portion and being disposed generally in a radial plane, each blade having opposed sides converging radially outwardly and axially away from the body portion and having inner and outer edges converging axially away from the body portion, means for removably securing said ring on the rotor of a D.C. machine, a plurality of riser segments arranged in circumferentially ring shape, means for retaining said riser segments in a ring upon said rotor, and each of said riser segments having a recess therein corresponding to the shape of a commutator segment blade for receiving a blade in wedged relation therein.

4. The structure as defined in claim 3 wherein the inner edge of each of said blades is disposed in substantial parallel relation with respect to the axis of said annular ring and said outer edge is spaced from its corresponding surface portion defined by the recess in its respective riser segment when in wedged relation therewith.

5. A D.C. machine including a rotor, an annular ring including a sleeve having a plurality of commutator segments clamped around the periphery thereof, each of said segments having a blade extending axially therefrom and disposed generally in a radial plane, each blade having opposed sides converging radially outwardly and axially away from its respective segment, means detachably mounting said sleeve in co-axial relation upon the rotor, a plurality of riser segments arranged in circumferentially adjacent ring shape, means engaging and retaining said riser segments in a ring upon the rotor, and each of said riser segments having a recess therein corresponding to the shape of a commutator segment blade and receiving a blade in wedged relation therein.

6. The structure as defined in claim 5 wherein said last mentioned means includes an annular tang affixed to said rotor engaging a recessed surface in each of said riser segments.

7. The structure as defined in claim 5 wherein the blade of each commutator segment includes an inner and an outer edge converging axially away from the segment.

8. Commutator construction for use with D.C. machines comprising a plurality of commutator segments arranged in circumferentially adjacent ring shape, means for retaining said segments in a ring upon a rotor of a D.C. machine, each of said segments having a blade extending axially therefrom and lying generally in a radially extending plane parallel to the axis of the ring, each blade having side surfaces oriented convergently in a direction obliquely with respect to the axis of the ring and away from its respective segment, a plurality of riser segments arranged in circumferentially adjacent ring shape, means for retaining said riser segments in a ring upon a rotor of a D.C. machine, and each of said riser segments having a surface therein corresponding to the shape of said blades for receiving a blade in wedged relation therein.

References Cited in the file of this patent
UNITED STATES PATENTS
742,743     Roach  ---------------- Oct. 27, 1903